(12) United States Patent
Oh et al.

(10) Patent No.: US 7,764,662 B2
(45) Date of Patent: Jul. 27, 2010

(54) SYSTEM AND METHOD FOR ALLOCATING FREQUENCY RESOURCE IN A MULTICELL COMMUNICATION SYSTEM

(75) Inventors: Seong-Keun Oh, Suwon-si (KR); Ki-Bum Kwon, Seongnam-si (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 1045 days.

(21) Appl. No.: 11/361,824

(22) Filed: Feb. 24, 2006

(65) Prior Publication Data

US 2006/0189321 A1    Aug. 24, 2006

(30) Foreign Application Priority Data

Feb. 24, 2005    (KR) .................... 10-2005-0015593

(51) Int. Cl.
*H03J 1/00*    (2006.01)

(52) U.S. Cl. .................... 370/343; 370/344; 455/450; 455/452.1; 455/452.2

(58) Field of Classification Search ................. 455/446, 455/450; 370/343, 344
See application file for complete search history.

(56) References Cited

U.S. PATENT DOCUMENTS

| | | | |
|---|---|---|---|
| 2004/0097238 A1 | 5/2004 | Hwang et al. | |
| 2005/0180375 A1* | 8/2005 | Batra et al. | 370/344 |
| 2006/0211426 A1* | 9/2006 | Costa et al. | 455/450 |
| 2006/0250935 A1* | 11/2006 | Hamamoto et al. | 370/203 |

FOREIGN PATENT DOCUMENTS

| KR | 1020040041009 | 5/2004 |
|---|---|---|
| WO | WO 2004/039114 | 5/2004 |

* cited by examiner

*Primary Examiner*—Ajit Patel
*Assistant Examiner*—Khai M Nguyen
(74) *Attorney, Agent, or Firm*—The Farrell Law Firm, LLP

(57) ABSTRACT

A multicell communication system includes a plurality of cells which use a frequency band on a division basis, wherein a frequency reuse factor K is defined such that the frequency band is divided into K sub-frequency bands, the K sub-frequency bands are allocated to K cells including a serving cell among the plurality of cells, and the K sub-frequency bands are reused in some of the remaining cells other than the K cells, and the K cells use the frequency band on a division basis. The frequency band is divided into a plurality of segment bands. The plurality of segment bands is mapped such that at least one of the segment bands is allocated to each of the band groups, to divide the frequency band into the K band groups. The K band groups is mapped such that a first band group which is a particular one of the K band groups is allocated to a center band, and the K band groups are mapped such that the remaining band groups other than the first band group among the K band groups are allocated to reuse band groups.

38 Claims, 11 Drawing Sheets

SYSTEM AND METHOD FOR ALLOCATING FREQUENCY RESOURCE IN A MULTICELL COMMUNICATION SYSTEM

PRIORITY

This application claims the benefit under 35 U.S.C. §119(a) of an application entitled "System and Method for Allocating Frequency Resource in a Multicell Communication System" filed in the Korean Intellectual Property Office on Feb. 24, 2005 and assigned Serial No. 2005-15593, the entire contents of which are incorporated herein by reference.

BACKGROUND OF THE INVENTION

1. Field of the Invention

The present invention relates generally to a multicell communication system, and in particular, to a system and method for allocating frequency resources to minimize inter-cell interference (ICI).

2. Description of the Related Art

A multicell communication system suffers from ICI, because multiple cells constituting the multicell communication system use limited resources, for example, frequency resources, code resources and time slot resources, on a division basis and some different cells reuse the same resources. When different cells reuse the frequency resources, code resources and time slot resources, the multicell communication system suffers from performance degradation due to the ICI, but it still benefits from increased total capacity.

In order to reuse frequency resources with reduced ICI in the multicell communication system in which multiple cells are provided and the cells use a frequency band on a division basis, the frequency band is divided into K sub-frequency bands, where K denotes the frequency reuse factor. The K sub-frequency bands are allocated to K cells including a serving cell among the multiple cells, and the K sub-frequency bands are reused in some of the remaining cells other than the K cells, taking into account the interference to or from other cells.

As the frequency reuse factor exceeds 1 (K>1), ICI decreases but the amount of frequency resources available in a cell also decreases, causing a reduction in the total capacity of the multicell communication system. When the frequency reuse factor is 1 (K=1), i.e., if all cells constituting the multicell communication system use the same frequency band, ICI increases but the amount of frequency resources available in a cell also increases, causing an increase in the total capacity of the multicell communication system.

A multicell communication system using a Code Division Multiple Access (CDMA) scheme allocates a unique scrambling code to each of cells as a result the CDMA multicell communication system distinguishes each of the cells. Due to the use of the scrambling codes, the CDMA multicell communication system minimizes ICI, and all cells constituting the CDMA multicell communication system reuse the frequency band of the CDMA multicell communication system, thereby maintaining the frequency reuse factor at 1.

The CDMA multicell communication system, when the frequency reuse factor is maintained at 1, may increase in ICI as compared when the frequency reuse factor is set higher than 1, but can increase efficiency of the frequency resources, contributing to noticeable improvements in total system capacity. In addition, the CDMA multicell communication system allocates a unique code to each of subscriber stations (SSs) in order to reduce interference between user signals of the SSs located in each of its cells. Therefore, each of the SSs spreads its user signal over the frequency band using the code uniquely allocated thereto before transmission. Herein, the code allocated to each of the SSs is an orthogonal code, and can minimize the interference between the SSs.

In the CDMA multicell communication system, an increase in number of SSs per cell increases the interference between the SSs or the ICI, causing a restriction of the total system capacity. However, if the number of SSs per cell are within the available number of SSs accommodated by each cell the increase in the interference between the SSs or the ICI does not affect the total system capacity and instead, increases efficiency of the frequency resources, contributing to an increase in the system capacity.

However, the CDMA multicell communication system dramatically decreases in its system efficiency when the frequency band is spread, because it transmits high-speed data. A detailed description of it is shown below. If the frequency band is spread the code length increases, the chip period decreases, multipath components need to be acquired, the system performance seriously degrades due to an increase in interference between the multipath components, and the system implementation complexity dramatically increases.

The $4^{th}$ Generation (4G) communication system is being developed to provide users with services having various Qualities-of-Service (QoS) guaranteeing a high data rate. In particular, active research is being conducted to support high-speed service that guarantees mobility and QoS for a Broadband Wireless Access (BWA) communication system such as a wireless Local Area Network (LAN) system and a wireless Metropolitan Area Network (MAN) system.

In the 4G communication system, an Orthogonal Frequency Division Multiplexing (OFDM)/Orthogonal Frequency Division Multiple Access (OFDMA) scheme is a scheme useful for high-speed data transmission in a wire/wireless channel. The OFDM/OFDMA scheme provides for transmitting data using multiple carriers, and is a Multi-Carrier Modulation (MCM) scheme that converts a serial input symbol stream into parallel symbols and modulates each of the parallel symbols with multiple orthogonal sub-carriers before transmission. Herein, a multicell communication system using the OFDM/OFDMA scheme will be referred to as an "OFDM/OFDMA multicell communication system."

The 4G communication system needs broad spectrum resources in order to provide high-speed, high-quality wireless multimedia service. The use of the broad spectrum resources increases a fading effect in a wireless transmission line due to multipath propagation, and causes a frequency selective fading effect even in a transmission band. The OFDM/OFDMA scheme helps to overcome this limitation, because OFDM/OFDMA, which is robust against frequency selective fading compared with CDMA, and has a higher gain. That is, OFDM/OFDMA can obtain the optimal transmission efficiency during high-speed data transmission as it maintains orthogonality between multiple sub-carriers during transmission. In addition, the OFDM/OFDMA scheme can obtain optimal transmission efficiency during high-speed data transmission because it has high frequency efficiency and is robust against multipath fading. Furthermore, the OFDM/OFDMA scheme, where frequency spectrums overlap each other, can reduce inter-symbol interference (ISI) using a guard interval, in addition to a simple hardware equalizer, impulse noises can be reduced.

A typical communication system using the OFDM/OFDMA scheme to support a broadband transmission network for physical channels, like the 4G communication system, includes an Institute of Electrical and Electronics Engineers (IEEE) 802.16 communication system and a flash- OFDM communication system. The IEEE 802.16 communication system, because it applies the OFDM/OFDMA scheme to the wireless MAN system, enables high-speed data transmission by transmitting physical channel signals using multiple sub-carriers. However, research into the 4G communication system, like research into the CDMA multicell communication system, is focused on the aspect of applying the frequency reuse factor 1 for communication.

For example, the flash-OFDM communication system, in order to average ICI experienced by each of the sub-carriers, generates a plurality of frequency hopping patterns using a pseudo random sequence and allocates the frequency hopping patterns to each of the cells constituting the flash-OFDM communication system, thereby allowing all of the cells to use the same frequency band. Therefore, the flash-OFDM communication system can apply the frequency reuse factor 1. However, the flash-OFDM communication system suffers from performance degradation due to interference between sub-carriers that use the same frequency resources between cells, like the general multicell communication system, as the number of sub-carriers used in each cell increases.

As another example, the IEEE 802.16 communication system, because it is based on the MAN communication system, has very low mobility or no mobility, like communication between base stations (BSs), and performs communication using a point-to-point method or a point-to-multipoint method other than the concept of the multicell communication system. Therefore, the IEEE 802.16 communication system cannot be applied to the general multicell communication system. Although research is now being conducted to apply mobility to the IEEE 802.16 communication system, there is no proposed scheme for minimizing ICI taking into account the multicell environment and the frequency reuse factor.

Accordingly, there is a need for a scheme for minimizing ICI while increasing efficiency of frequency resources by applying the frequency reuse factor 1 in the multicell communication system as described above.

SUMMARY OF THE INVENTION

One object of the present invention to provide a system and method for allocating frequency resources to minimize inter-cell interference (ICI) in a multicell communication system.

It is another object of the present invention to provide a system and method for allocating frequency resources by applying a frequency reuse factor according to characteristics of areas in a multicell communication system.

Yet another object of the present invention to provide a system and method for allocating frequency resources to maximize efficiency of the frequency resources in a multicell communication system.

One aspect of the present invention provides a system for allocating frequency resources in a serving cell in a multicell communication system that includes a plurality of cells which use a frequency band on a division basis, wherein a frequency reuse factor K is defined such that the frequency band is divided into K sub-frequency bands, the K sub-frequency bands are allocated to K cells including the serving cell among the plurality of cells, and the K sub-frequency bands are reused in some of the remaining cells other than the K cells, and the K cells use the frequency band on a division basis. The system includes a controller for dividing the frequency band into a plurality of segment bands, dividing the frequency band into the K band groups by mapping the plurality of segment bands such that at least one segment band among the plurality of segment bands is allocated to each of the band groups, mapping the K band groups such that a first band group which is a particular one of the K band groups is allocated to a center band, mapping the K band groups such that the remaining band groups except for the first band group among the K band groups are allocated to reuse band groups, and if there is user data targeting a plurality of subscriber stations, allocating a plurality of band groups to be used for transmitting user data for each of the subscriber stations among the plurality of band groups; a band group allocator for, under the control of the controller, allocating user data for each of the subscriber stations such that the user data is transmitted through a corresponding band group; a segment allocator for, under the control of the controller, allocating segment bands of the band groups allocated such that the user data for each of the subscriber stations is transmitted; and a radio frequency (RF) processor for RF-processing a signal of the segment-allocated band groups and transmitting the signal.

According to another aspect of the present invention, there is provided a method for allocating frequency resources in a serving cell in a multicell communication system that includes a plurality of cells which use a frequency band on a division basis, wherein a frequency reuse factor K is defined such that the frequency band is divided into K sub-frequency bands, the K sub-frequency bands are allocated to K cells including the serving cell among the plurality of cells, and the K sub-frequency bands are reused in some of the remaining cells except for the K cells, and the K cells use the frequency band on a division basis. The method includes dividing the frequency band into a plurality of segment bands; mapping the plurality of segment bands such that at least one of the segment bands is allocated to each of the band groups, to divide the frequency band into the K band groups; and mapping the K band groups such that a first band group which is a particular one of the K band groups is allocated to a center band, and mapping the K band groups such that the remaining band groups except for the first band group among the K band groups are allocated to reuse band groups.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention utilizes a system and method for allocating frequency resources to maximize efficiency of the frequency resources while minimizing inter-cell interference (ICI) in a multicell communication system. In particular, the system and method minimizes ICI while it maximizes efficiency of frequency resources, by allocating the frequency resources according to characteristics of bands in a cell in order that an actual frequency reuse factor $\tilde{K}$ becomes 1 ($\tilde{K}=1$) in a multicell communication system.

In order to reuse frequency resources with reduced ICI in the multicell communication system in which multiple cells are provided and the cells use a frequency band on a division basis, the frequency band is divided into K sub-frequency bands, where K denotes the frequency reuse factor. The K sub-frequency bands are allocated to K cells including a serving cell among the multiple cells, and the K sub-frequency bands are reused in some of the remaining cells except for the K cells, taking into account the interference to or from other cells.

For convenience, it will be assumed herein that the subject of allocating frequency resources in the multicell communication system is a controller of each cell, and the controller allocates the frequency resources taking into account frequency resources of the cells constituting the multicell communication system as well.

Figure 1:
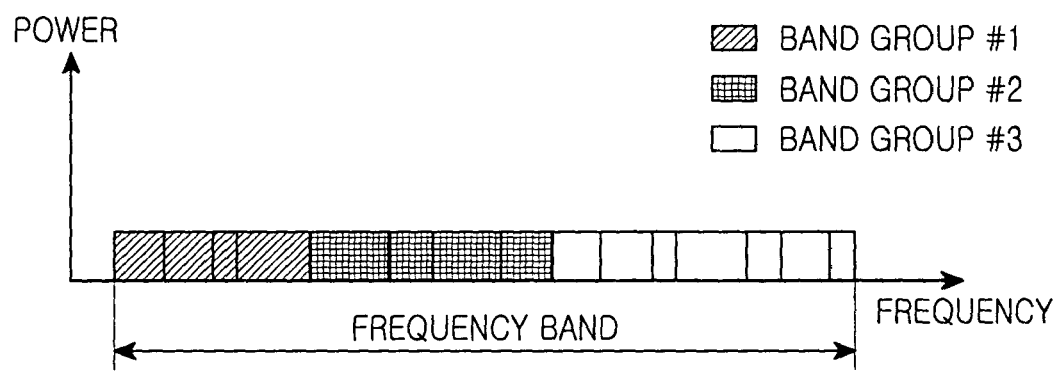
FIG. 1 illustrates a band group division operation in a multicell communication system using a consecutive division technique according to the present invention.

FIG. 1 schematically illustrates a band group division operation in a multicell communication system using a consecutive division technique according to the present invention.

Referring to FIG. 1, the present invention divides a frequency band into a plurality of band groups in each cell of the multicell communication system. The number of band groups divided from the frequency band is equal to the frequency reuse factor K.

Two new terms are introduced by this invention, "center band" and "reuse bands". Each of cells constituting the multicell communication system manages a center band and at least one or more neighbor cell reuse bands so that each of the cells has the same result that it applies the frequency reuse factor K in each of the bands, i.e., the center band and the at least one or more reuse bands, even while applying an actual frequency reuse factor of 1 ($\tilde{K}=1$). As described above, the frequency reuse factor is defined as repeatedly using the same frequency resource, i.e., the same frequency band, for every K cells/sectors. The present invention divides each of the cells/sectors into a plurality of, for example K, bands, with an actual frequency reuse factor for each of the cells/sectors being set to 1, and applies the frequency reuse factor K to each of the K bands. That is, the present invention controls frequency resource allocation such that although an actual frequency reuse factor is 1 in every cell, the frequency reuse factor becomes K in each band, thereby enabling the frequency resource allocation capable of minimizing ICI while maximizing the efficiency of the frequency resources. A detailed description of an operation of dividing each of the cells into a plurality of bands will be made later.

FIG. 1 illustrates band groups divided for the case where a frequency reuse factor K applied to each band is 3 (K=3) and a consecutive division technique is used. That is, because the consecutive division technique is used, a controller divides a frequency band of a corresponding cell into 3 physically consecutive band groups, i.e., a first band group G1, a second band group G2, and a third band group G3. The reason for dividing the frequency band into as many band groups as the frequency reuse factor K is to obtain the same result that a corresponding cell applies the frequency reuse factor K in each of its bands even while applying the actual frequency reuse factor to 1 ($\tilde{K}=1$). That is, because the corresponding cell applies the actual frequency reuse factor $\tilde{K}=1$, it is possible to minimize ICI even while maximizing the efficiency of the frequency resources, by allocating the band groups divided according to the frequency reuse factor K to the bands in the cell depending to characteristics of the bands in the corresponding cell.

In addition, each of the divided band groups is mapped such that it is allocated to any one of the center band and reuse bands in the corresponding cell. A description of some of the aspects of the center band and the reuse bands follows.

Note that a cell structure differs in its characteristics based on how close it is to the cell center, i.e., whether a corresponding area is a cell center area or a cell boundary area.

(1) Delay spread aspect

The cell center area has less delay spread, while the cell boundary area has greater delay spread.

(2) Frequency selective fading aspect

The cell center area is stable as it is scarcely affected by frequency selective fading, while the cell boundary area is considerably affected by the frequency selective fading.

(3) ICI variation aspect

The cell center area is stable in terms of the ICI variation, while the cell boundary area is considerable in terms of the ICI variation.

As described above, in general the cell center area is superior in its characteristics to the cell boundary area. The present invention defines, as a center band, the band mapped such that it is allocated to the cell boundary area, and defines, as reuse bands, the bands mapped such that they are allocated to the cell center area. Although the foregoing description has been made on the assumption that the center band is allocated to the cell boundary area and the reuse bands are allocated to the cell center area, the areas in the cell, to which the center band and the reuse bands are allocated, can be variably set according to conditions of the multicell communication system.

Furthermore, it will be assumed that the multicell communication system has N cells of a first cell through an $N^{th}$ cell, and each of the bands in each cell applies the frequency reuse factor K. In the first cell which is a serving cell, a first band group which is any one of K band groups created by dividing the frequency band is mapped to a center band of the first cell, and the remaining band groups except for the first band group, i.e., the second through $K^{th}$ band groups, are mapped to the reuse bands. Further, the first band group mapped to the center band of the first cell is mapped to a center band of a cell, i.e., $(K+1)^{th}$ cell, spaced apart from the first cell according to the frequency reuse factor K, so as to minimize ICI.

In addition, each of the first band group G1, the second band group G2 and the third band group G3 includes at least one or more segments, and when the consecutive division technique is used, each of the band groups includes at least one or more physically consecutive segment bands.

The band group division operation using the consecutive division technique according to the present invention has been described so far with reference to FIG. 1.

Figure 2:
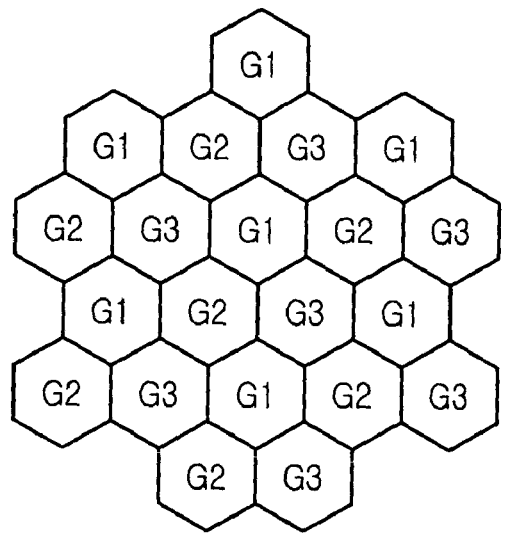
FIG. 2 illustrates an operation of allocating a center band of each cell in a multicell communication system in which a frequency reuse factor K=3 is applied in each band according to the present invention.

FIG. 2 schematically illustrates the allocation operation of a center band of each cell in a multicell communication system in which a frequency reuse factor K=3 is applied in each band.

Because it is assumed that the frequency reuse factor K=3 is applied in each band, a frequency band of each cell constituting the multicell communication system is divided into 3 band groups of a first band group G1, a second band group G2 and a third band group G3. Any one band group, for example, the first band group G1, among the first band group G1, the second band group G2 and the third band group G3, is mapped such that it is allocated to the center band in a serving cell, and the first band group G1 is, to be reused, mapped such that it is allocated to a center band in the cells exceeding a preset range. Herein, the term "preset range" refers to a range corresponding to the frequency reuse factor K applied to each band. Because it is assumed in FIG. 2 that the frequency reuse factor K is 3 (K=3), at least 3 cells are spaced apart and mapped such that the first band group G1 is allocated to the center band. FIG. 2 shows only the band groups used as a center band of each cell, and shows that a band group of the same frequency band is prevented from being used as the center band between neighbor cells, thereby minimizing ICI generation.

Figure 3:
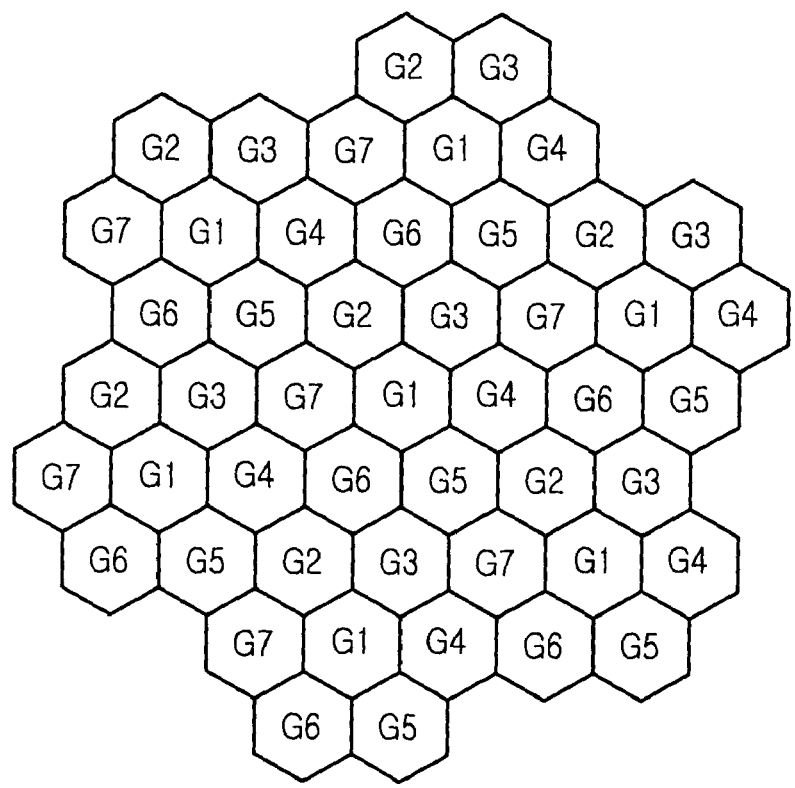
FIG. 3 illustrates an operation of allocating a center band of each cell in a multicell communication system in which a frequency reuse factor K=7 is applied in each band according to the present invention.

FIG. 3 schematically illustrates the allocation operation a center band of each cell in a multicell communication system in which a frequency reuse factor K=7 is applied in each band.

Because it is assumed that the frequency reuse factor K=7 is applied in each band, a frequency band of each cell constituting the multicell communication system is divided into 7 band groups of a first band group G1, a second band group G2, a third band group G3, a fourth band group G4, a fifth band group G5, a sixth band group G6, and a seventh band group G7. Then, the first band group G1, the second band group G2, the third band group G3, the fourth band group G4, the fifth band group G5, the sixth band group G6, and the seventh band group G7 are mapped such that they are allocated to each center band according to a cell frequency allocation rule that is previously set for 7 cells neighboring a serving cell, including the serving cell, existing within a preset range, depending on the frequency reuse factor K=7. For the cells exceeding the preset range, the band group used as a center band in the serving cell, i.e., the first band group G1 is mapped such that it is reused as a center band. FIG. 3 shows only the band groups used as a center band of each cell, shows that a band group of the same frequency band is prevented from being used as the center band between neighbor cells, thereby minimizing ICI generation.

Figure 4:
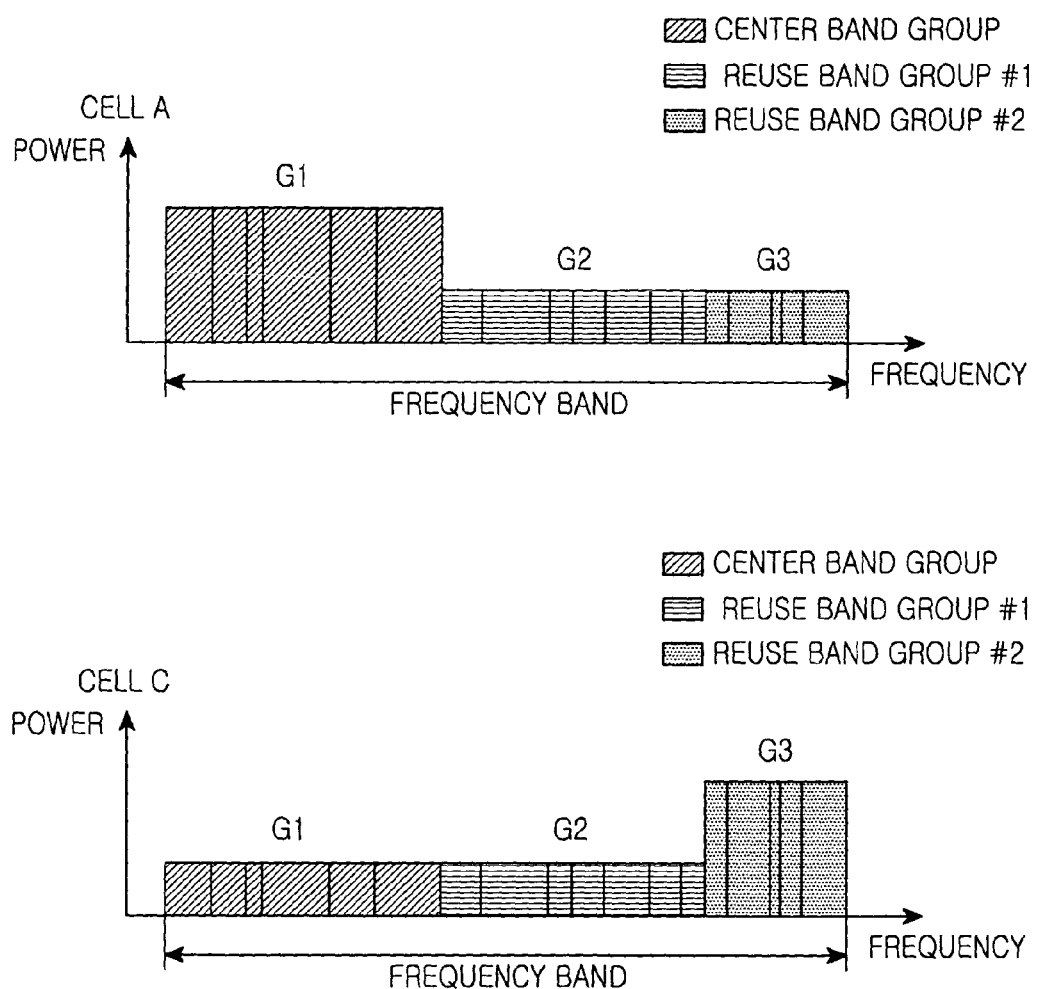
FIG. 4 illustrates an operation of allocating a reuse band after allocating a center band in each cell in a multicell communication system using a consecutive division technique according to the present invention.

FIG. 4 schematically illustrates the allocation operation of a reuse band after allocating a center band in each cell in a multicell communication system using a consecutive division technique.

It will be assumed in FIG. 4 that a frequency reuse factor K=3 is applied to each band of the multicell communication system. Therefore, a frequency band of the multicell communication system is divided into 3 band groups of a first band group G1, a second band group G2 and a third band group G3, and each of the divided band groups is mapped such that it is allocated to each center band in 3 neighbor cells, thereby minimizing ICI generation. It will be further assumed that the 3 neighbor cells are a cell A, a cell B and a cell C, and the band groups are sequentially mapped such that the first band group G1 is allocated to a center band in the cell A, the second band group G2 is allocated to a center band in the cell B, and the third band group G3 is allocated to a center band in the cell C.

When a multicell communication system applies an actual frequency reuse factor $\tilde{K}=1$ in each cell other than each area, the cell A through the cell C use not only the band group mapped such that it is allocated to its center band, but also the remaining band groups. That is, the cell A maps the second band group G2 and the third band group G3 such that they are allocated to reuse bands, the cell B maps the first band group G1 and the third band group G3 such that they are allocated to reuse bands, and the cell C maps the first band group G1 and the second band group G2 such that they are allocated to reuse bands. In this case, because band groups allocated to reuse bands of each cell are allocated to center bands in other cells except for the corresponding cell, when the same transmission power as the transmission power used in the center band in the corresponding cell is applied to the reuse bands, it serves as ICI to the center bands of other cells. Therefore, in order to maintain the ICI to the center bands of other cells below a preset range that satisfies the required performance of the multicell communication system, the reuse bands should use transmission power below the transmission power applied in the center band, i.e., should use transmission power determined taking into account even the ICI to the center bands of other cells.

The present invention maximizes average frequency efficiency per cell in terms of the total system resource utilization of the multicell communication system, by adjusting the amount of the ICI to the center bands of other cells mapped such that a signal in each band group used as reuse bands in the serving cell is allocated to the center band of the corresponding band group. Therefore, the present invention sets a power density in the reuse bands taking into account the ICI. Of course, it is not necessarily required to set the power density in the reuse bands so as to maximize the average frequency efficiency per cell, and it is also possible to set the power density in the reuse bands according to another criterion or with a slight margin, or to set the power density in the reuse bands according to frequency reuse factor, antenna type, system configuration, and multiple access scheme. Also, a power density for the respective segment bands of each of the band groups can be variably determined according to the frequency reuse factor, an antenna type, a configuration of the multicell communication system, and a multiple access scheme applied in the multicell communication system, although not shown in the drawing.

FIG. 4 illustrates a relationship between center band and reuse band allocation and its power density, i.e., transmission power, for the cell A and the cell C. In the cell A, because the band groups are mapped such that the first band group G1 is allocated to the center band and the second band group G2 and the third band group G3 are allocated to the reuse bands, transmission power of the second band group G2 and the third band group G3 is set lower than the transmission power of the first band group G1, taking the ICI into account. In the cell C, because the band groups are mapped such that the third band group G3 is allocated to the center band and the first band group G1 and the second band group G2 are allocated to the reuse bands, transmission power of the first band group G1 and the second band group G2 is set lower than the transmission power of the third band group G3, taking the ICI into account.

Although it is assumed in FIG. 4 that transmission power applied to the reuse bands except for the center band in the corresponding cell is set uniformly, transmission power applied to each of the reuse bands may be set non-uniformly. For example, transmission power of the first band group G1 and the second band group G2 allocated to the reuse bands of the cell C is set non-uniformly, rather than being set uniformly.

Figure 5:
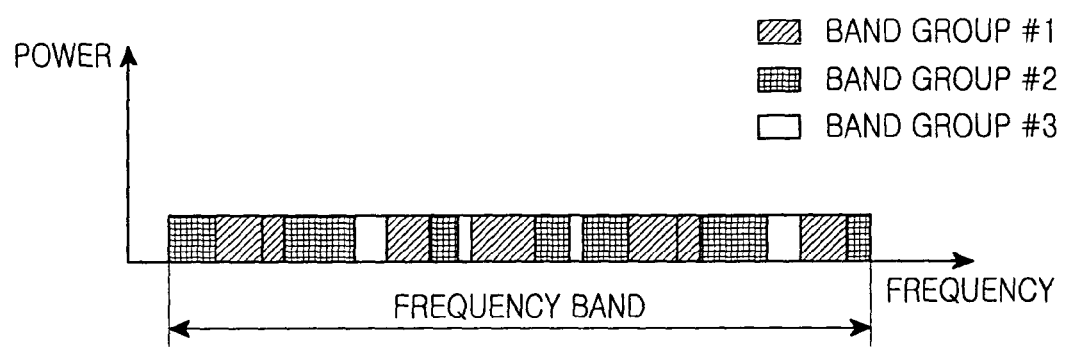
FIG. 5 illustrates an operation of allocating band groups in a multicell communication system using a non-consecutive division technique according to the present invention.

FIG. 5 is a diagram schematically illustrating an operation of allocating band groups in a multicell communication system using an inconsecutive division technique according to the present invention.

While an embodiment of the present invention described with reference to FIG. 1 divides the frequency band used in the multicell communication system into as many band groups as the frequency reuse factor K desired to be applied in each band, another embodiment of the present invention shown in FIG. 5 proposes a band group allocation method. FIG. 5 is schematically illustrates the allocation operation of band groups in a multicell communication system using a non-consecutive division technique, where the frequency reuse factor desired to be applied in each band is 3 (K=3) and a non-consecutive division technique is used. That is, because band groups are divided with the non-consecutive division technique, the frequency band of the multicell communication system is divided into 3 physically non-consecutive band groups of a first band group G1, a second band group G2 and a third band group G3. The band group division operation using the non-consecutive division technique is different from the band group division operation using the consecutive division technique described with reference to FIG. 1 only in that the frequency band generated by the band groups is non-consecutive. The two band group division operations are equal to each other in terms of others. That is, while the band group division operation of FIG. 1 divides the frequency band into 3 physically consecutive band groups into band groups, the band group division operation of FIG. 5 divides the frequency band into 3 physically non-consecutive band groups.

Figure 6:
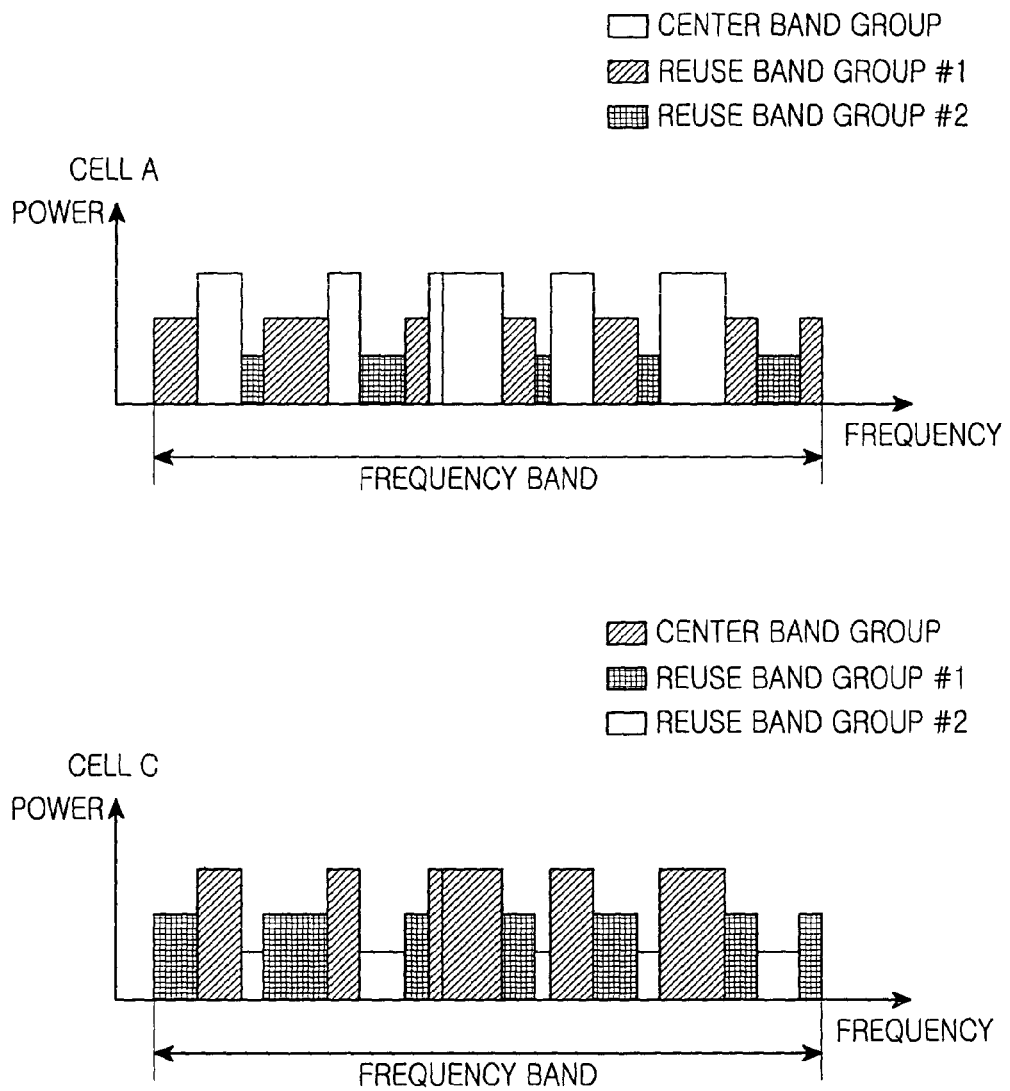
FIG. 6 illustrates an operation of allocating a reuse band after allocating a center band in each cell in a multicell communication system using a non-consecutive division technique according to the present invention.

FIG. 6 schematically illustrates the allocation operation of a reuse band after allocating a center band in each cell in a multicell communication system using a non-consecutive division technique according to the present invention.

It will be assumed in FIG. 6 that a frequency reuse factor K=3 is applied to each band. Therefore, a frequency band of the multicell communication system is divided into 3 band groups of a first band group G1, a second band group G2 and a third band group G3, and each of the divided band groups is used as a center band in each of 3 neighbor cells, thereby minimizing ICI generation. It will be assumed herein that the 3 neighbor cells are a cell A, a cell B and a cell C, and the band groups are sequentially mapped such that the first band group G1 is allocated to a center band in the cell A, the second band group G2 is allocated to a center band in the cell B, and the third band group G3 is allocated to a center band in the cell C.

When a multicell communication system applies an actual frequency reuse factor $\tilde{K}=1$ in every cell, the cell A through the cell C use not only the band group allocated to its center band, but also the remaining band groups. That is, the cell A maps the second band group G2 and the third band group G3 such that they are allocated to reuse bands, the cell B maps the first band group G1 and the third band group G3 such that they are allocated to reuse bands, and the cell C maps the first band group G1 and the second band group G2 such that they are allocated to reuse bands. In this case, because reuse bands used in each cell is used as a center band in other cells except for the corresponding cell, when the same transmission power as the transmission power applied to the center band in the corresponding cell is applied to the reuse bands, it serves as ICI to the center bands of other cells. Therefore, in order to maintain the ICI to the center bands of other cells below a preset range that satisfies the required performance of the multicell communication system, the reuse bands should use transmission power below the transmission power applied in the center band, i.e., should use transmission power determined taking into account the ICI to the center bands of other cells.

The reuse band allocation operation using the non-consecutive division technique is different from the reuse band allocation operation using the consecutive division technique described with reference to FIG. 4 only in that the frequency band generated by the band groups is non-consecutive. The two reuse band allocation operations are equal to each other in terms of others. That is, while the reuse band allocation operation of FIG. 4 divides the frequency band into 3 physically consecutive band groups into band groups, the reuse band allocation operation of FIG. 6 divides the frequency band into 3 physically non-consecutive band groups.

Figure 7:
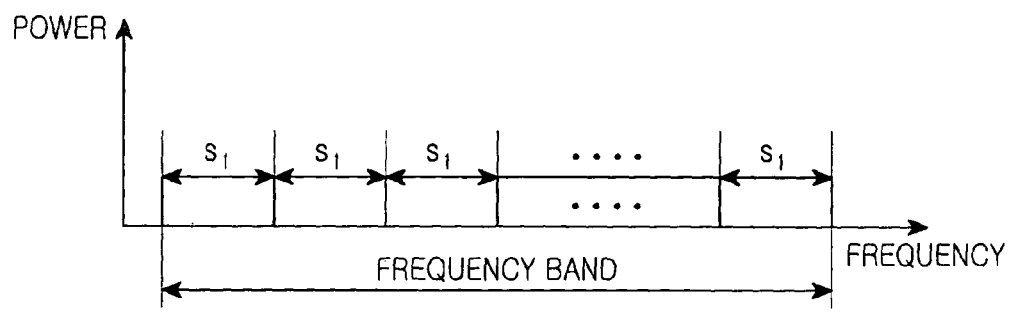
FIG. 7 illustrates an operation of dividing segment bands in a multicell communication system using a uniform division technique according to the present invention.

FIG. 7 schematically illustrates the operation of dividing segment bands in a multicell communication system using a uniform division technique according to the present invention.

It should be noted that in dividing the frequency band into as many band groups as the frequency reuse factor K to be applied to each band in the multicell communication system as described in FIGS. 1 and 5, in order to increase efficiency of frequency resources and flexibility of frequency resource allocation, the frequency band of the multicell communication system is divided into a plurality of segment bands according to system requirements, user requirements, traffic characteristics and service type. In addition, one band group is generated by selecting at least one or more segment bands from the plurality of segment bands. Herein, the same segment band is applied to only one band group and is prevented from being simultaneously applied to two or more band groups, thereby minimizing interference within the corresponding cell or between other cells due to the allocation of the same frequency band.

The preferred method of dividing a frequency band into a plurality of segment bands with the same bandwidth $s_1$ using a uniform division technique is shown in FIG. 7. Herein, the bandwidth of each segment band is uniformly determined to increase efficiency of frequency resources and readiness of frequency resource allocation.

Figure 8:
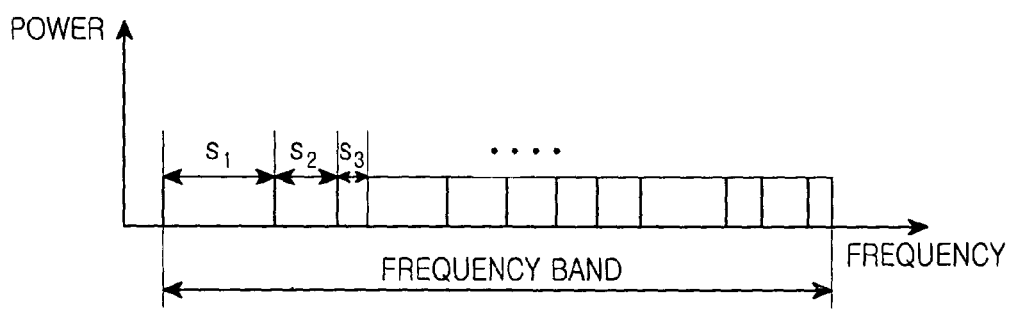
FIG. 8 illustrates an operation of dividing segment bands in a multicell communication system using a non-uniform division technique according to the present invention.

FIG. 8 schematically illustrates an operation of dividing segment bands in a multicell communication system using a non-uniform division technique according to the present invention.

Unlike the operation of dividing segment bands using the uniform division technique described with reference to FIG. 7, the segment band division operation proposed in FIG. 8 divides the frequency band into a plurality of segment bands with different bandwidths $s_1, s_2, s_3, \ldots$, using the non-uniform division technique. Herein, the bandwidth of each segment band is non-uniformly determined according to system requirements and user requirements.

As described with reference to FIGS. 7 and 8, the frequency band of the multicell communication system is divided into a plurality of segment bands with the uniform bandwidth using the uniform division technique, or divided into a plurality of segment bands with non-uniform bandwidths using the non-uniform division technique. Of the segment bands, at least one or more segment bands constitute one band group. The segment bands constituting one band group can be physically consecutive segment bands or physically non-consecutive segment bands. That is, the segment bands constituting each band group are physically consecutive segment bands in FIG. 1, and the segment bands constituting each band group are physically non-consecutive segment bands in FIG. 5.

When a band group mapped such that it is allocated to a center band in a serving cell in the multicell communication system is reused in center bands in other cells including the serving cell, exceeding a preset range, according to a frequency reuse factor K of each band in the serving cell, the cells using the same frequency bands as their center bands, even though the frequency bands in use are equal to each other, can independently set the form of the band groups constituting the same frequency bands for every cell. Similarly, the segment band division form in the band group mapped such that it is allocated to a center band in a particular cell and the band groups mapped such that they are allocated to reuse bands, can also be independently set for every cell.

In setting bandwidths of the segment bands, a communication system using a plurality of orthogonal sub-carriers with the same bandwidth over its frequency band, such as a communication system using a Orthogonal Frequency Division Multiplexing (OFDM) scheme, a communication system using an Orthogonal Frequency Division Multiple Access (OFDMA) scheme, and a communication system using a Multi Carrier-Code Division Multiple Access (MC-CDMA) scheme, defines one sub-carrier as a minimum segment band, and may set one minimum segment band as one segment band, or may set a plurality of minimum segment bands as one segment band. Each of the OFDM communication system, the OFDMA communication system, and the MC-CDMA communication system will be referred to as a "multi-carrier multicell communication system."

Figure 9:
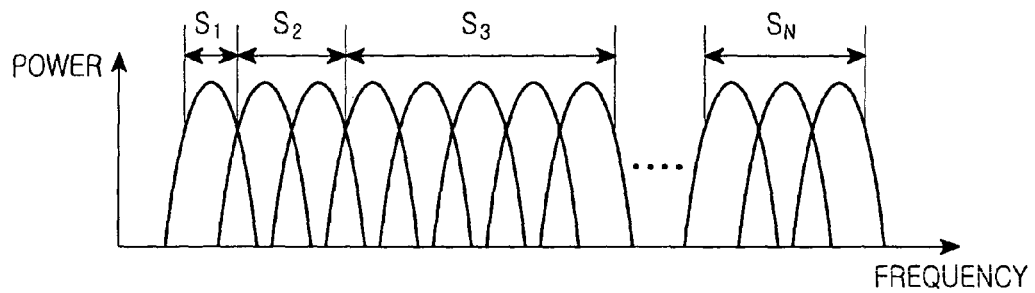
FIG. 9 illustrates an operation of dividing a segment band using a minimum segment band in a multi-carrier multicell communication system according to the present invention.

FIG. 9 schematically illustrates an operation of dividing a segment band using a minimum segment band in a multi-carrier multicell communication system according to the present invention.

It will be assumed in FIG. 9 that one sub-carrier, i.e., the minimum segment band has a bandwidth $s_1$. Therefore, one segment band can be comprised of one minimum segment band or a plurality of minimum segment bands $(s_2, s_3, \ldots, s_N)$. In the case where one segment band can be created with a plurality of the minimum segment bands, one segment band can be created with a plurality of physically consecutive minimum segment bands, or with a plurality of physically non-consecutive minimum segment bands.

Figure 10:
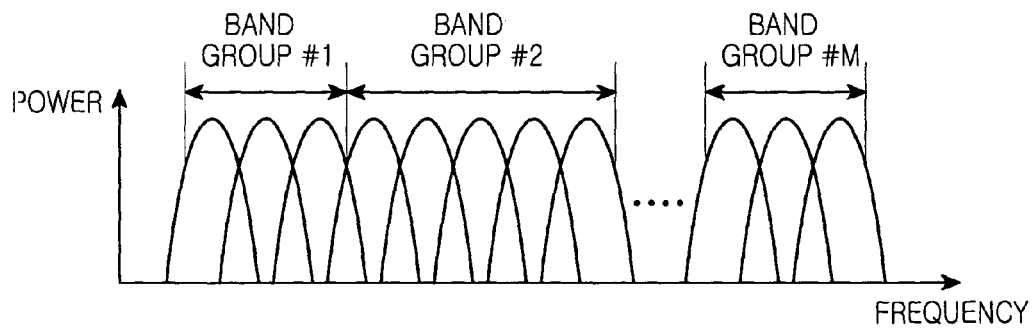
FIG. 10 illustrates an operation of creating a band group with a plurality of physically consecutive minimum segment bands in a multi-carrier multicell communication system according to the present invention.

FIG. 10 schematically illustrates an operation of creating a band group with a plurality of physically consecutive minimum segment bands in a multi-carrier multicell communication system according to the present invention.

In FIG. 10, there is illustrated for example, a plurality of M band groups of a first band group through an $M^{th}$ band group, each of which is created with a plurality of physically consecutive minimum segment bands.

Figure 11:
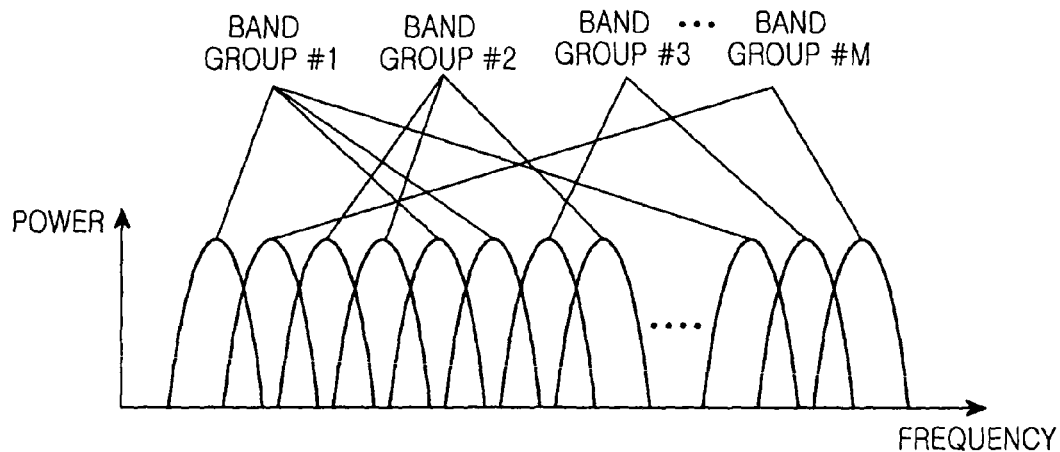
FIG. 11 illustrates an operation of creating a band group with a plurality of physically a non-consecutive minimum segment bands in a multi-carrier multicell communication system according to the present invention.

FIG. 11 schematically illustrates an operation of creating a band group with a plurality of physically non-consecutive minimum segment bands in a multi-carrier multicell communication system according to the present invention.

For a plurality of, for example, M band groups of a first band group through an $M^{th}$ band group, each of which is created with a plurality of physically non-consecutive minimum segment bands.

In the multi-carrier multicell communication, in order to obtain a frequency diversity gain and prevent a particular band group from continuously suffering from frequency selective fading, the system can periodically or a periodically hop the frequency band corresponding to a band group of each cell by periodically or a periodically setting different segment bands constituting the band group. There are several techniques for periodically or a periodically hopping a frequency band corresponding to a band group of each cell, i.e., several techniques for changing grouping of segment bands constituting each band group.

Figure 12:
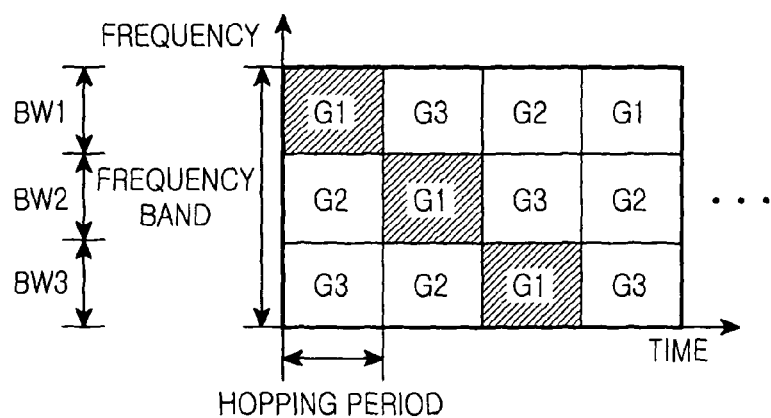
FIG. 12 illustrates a first hopping pattern of segment bands constituting a band group in a multi-carrier multicell communication system according to the present invention.

FIG. 12 schematically illustrates a first hopping pattern of segment bands constituting a band group in a multi-carrier multicell communication system according to the present invention.

FIG. 12 shows a first hopping pattern applied to segment bands constituting a band group in a multi-carrier multicell communication system in which each band applies a frequency reuse factor K=3. For convenience, in FIG. 12, there is shown a first hopping pattern applied to segment bands in the case where all bandwidths of segment bands constituting each band group are uniform, i.e., where band groups are created using the uniform division technique.

Because the multi-carrier multicell communication system uses a frequency reuse factor K=3 for each band, a particular cell of the multi-carrier multicell communication system divides the frequency band into 3 band groups of a first band group G1, a second band group G2 and a third band group G3 using the uniform division technique. For the first band group G1, the second band group G2 and the third band group G3, segment bands constituting the band group according to a first hopping pattern having a cyclic shift pattern are hopped according to a preset hopping period. For example, a frequency band occupied by segment bands constituting the first band group G1 is hopped with a frequency band BW1 in a first hoping period, with a frequency band BW2 in a second hopping period, and with a frequency band BW3 in a third hopping period. That is, a particular frequency band, for example, the frequency band BW1, makes the first band group G1 in the first hopping period, the third band group G3 in the second hopping period, the second band group G2 in the third hopping period, and the first band group G1 in a fourth hopping group. In this manner, segment bands constituting the band group are hopped on a cyclic shift basis according to the hopping periods.

Figure 13:
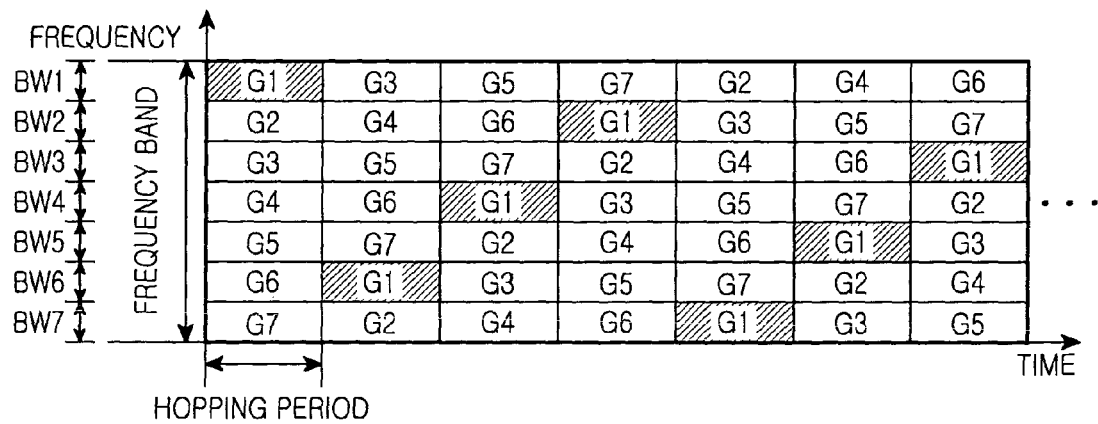
FIG. 13 illustrates a second hopping pattern of segment bands constituting a band group in a multi-carrier multicell communication system according to the present invention.

FIG. 13 schematically illustrates a second hopping pattern of segment bands constituting a band group in a multi-carrier multicell communication system according to the present invention.

In FIG. 13, there is illustrated a second hopping pattern applied to segment bands constituting a band group in the multi-carrier multicell communication system in which each band applies a frequency reuse factor K=7. For convenience, a second hopping pattern is applied to segment bands in the case where all bandwidths of segment bands constituting each band group are uniform, i.e., where band groups are created using the uniform division technique.

Because the multi-carrier multicell communication system uses a frequency reuse factor K=7 for each band, a particular cell of the multi-carrier multicell communication system divides the frequency band into 7 band groups of a first band group G1, a second band group G2, a third band group G3, a fourth band group G4, a fifth band group G5, a sixth band group G6 and a seventh band group G7 using the uniform division technique. For the first band group G1, the second band group G2, the third band group G3, the fourth band group G4, the fifth band group G5, the sixth band group G6 and the seventh band group G7, segment bands constituting the band group according to a second hopping pattern having a preset slope are hopped according to a preset hopping period. For example, a frequency band occupied by segment bands constituting the first band group G1 is hopped with a frequency band BW1 in a first hoping period, with a frequency band BW6 in a second hopping period, with a frequency band BW4 in a third hopping period, with a frequency band BW2 in a fourth hopping period, with a frequency band BW7 in a fifth hopping period, with a frequency band BW5 in a sixth hopping period, and with a frequency band BW3 in a seventh hopping period. That is, a particular frequency band, for example, the frequency band BW1, makes the first band group G1 in the first hopping period, the third band group G3 in the second hopping period, the fifth band group G5 in the third hopping period, the seventh band group G7 in the fourth hopping group, the second band group G2 in the fifth hopping period, the fourth band group G4 in the sixth hopping period, and sixth band group G6 in the seventh hopping period, so the same frequency band differs in the band group according to its hopping period.

Figure 14:
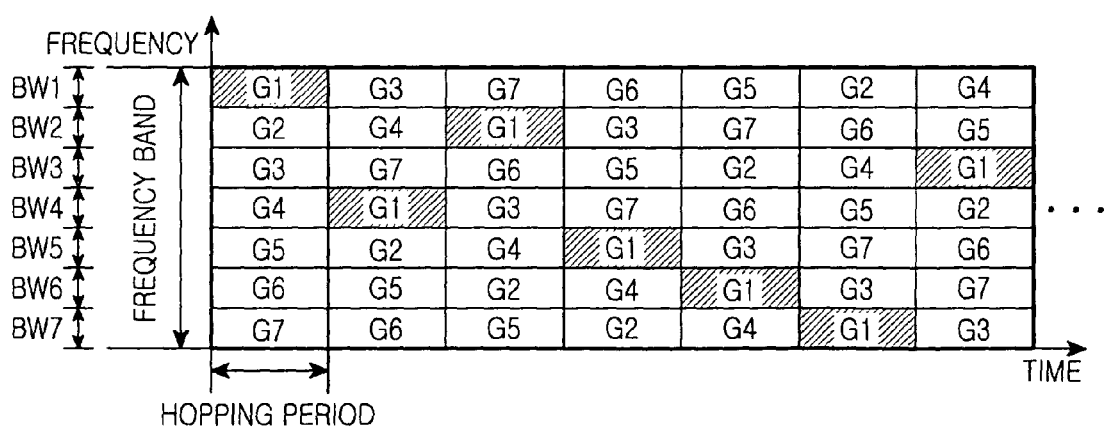
FIG. 14 illustrates a third hopping pattern of segment bands constituting a band group in a multi-carrier multicell communication system according to the present invention.

FIG. 14 schematically illustrates a third hopping pattern of segment bands constituting a band group in a multi-carrier multicell communication system according to the present invention.

In FIG. 14, there is illustrated a third hopping pattern applied to segment bands constituting a band group in the multi-carrier multicell communication system in which each band applies a frequency reuse factor K=7. For convenience, a third hopping pattern is applied to segment bands in the case where all bandwidths of segment bands constituting each band group are uniform, i.e., where band groups are created using the uniform division technique.

Because the multi-carrier multicell communication system uses a frequency reuse factor K=7 for each band, a particular cell of the multi-carrier multicell communication system divides the frequency band into 7 band groups of a first band group G1, a second band group G2, a third band group G3, a fourth band group G4, a fifth band group G5, a sixth band group G6 and a seventh band group G7 using the uniform division technique. For the first band group G1, the second band group G2, the third band group G3, the fourth band group G4, the fifth band group G5, the sixth band group G6 and the seventh band group G7, segment bands constituting the band group according to a third hopping pattern having a random form are hopped according to a preset hopping period. Herein, the third hopping pattern has the form in which the first band group G1, the second band group G2, the third band group G3, the fourth band group G4, the fifth band group G5, the sixth band group G6, and the seventh band group G7 each are randomly hopped only once in the hopping period.

For example, a frequency band occupied by segment bands constituting the first band group G1 is hopped with a frequency band BW1 in a first hoping period, with a frequency band BW4 in a second hopping period, with a frequency band BW2 in a third hopping period, with a frequency band BW5 in a fourth hopping period, with a frequency band BW6 in a fifth hopping period, with a frequency band BW7 in a sixth hopping period, and with a frequency band BW3 in a seventh hopping period. That is, a particular frequency band, for example, the frequency band BW1, makes the first band group G1 in the first hopping period, the third band group G3 in the second hopping period, the seventh band group G7 in the third hopping period, the sixth band group G6 in the fourth hopping group, the fifth band group G5 in the fifth hopping period, the second band group G2 in the sixth hopping period, and fourth band group G4 in the seventh hopping period. In this manner, segment bands constitutes band group which are randomly hopped according to the hopping period. In addition, various sequences can be used to determine the random type of third hopping pattern. For example, in orthogonal sequences the orthogonality can be used to prevent collision between the segment bands constituting each band group.

Figure 15:
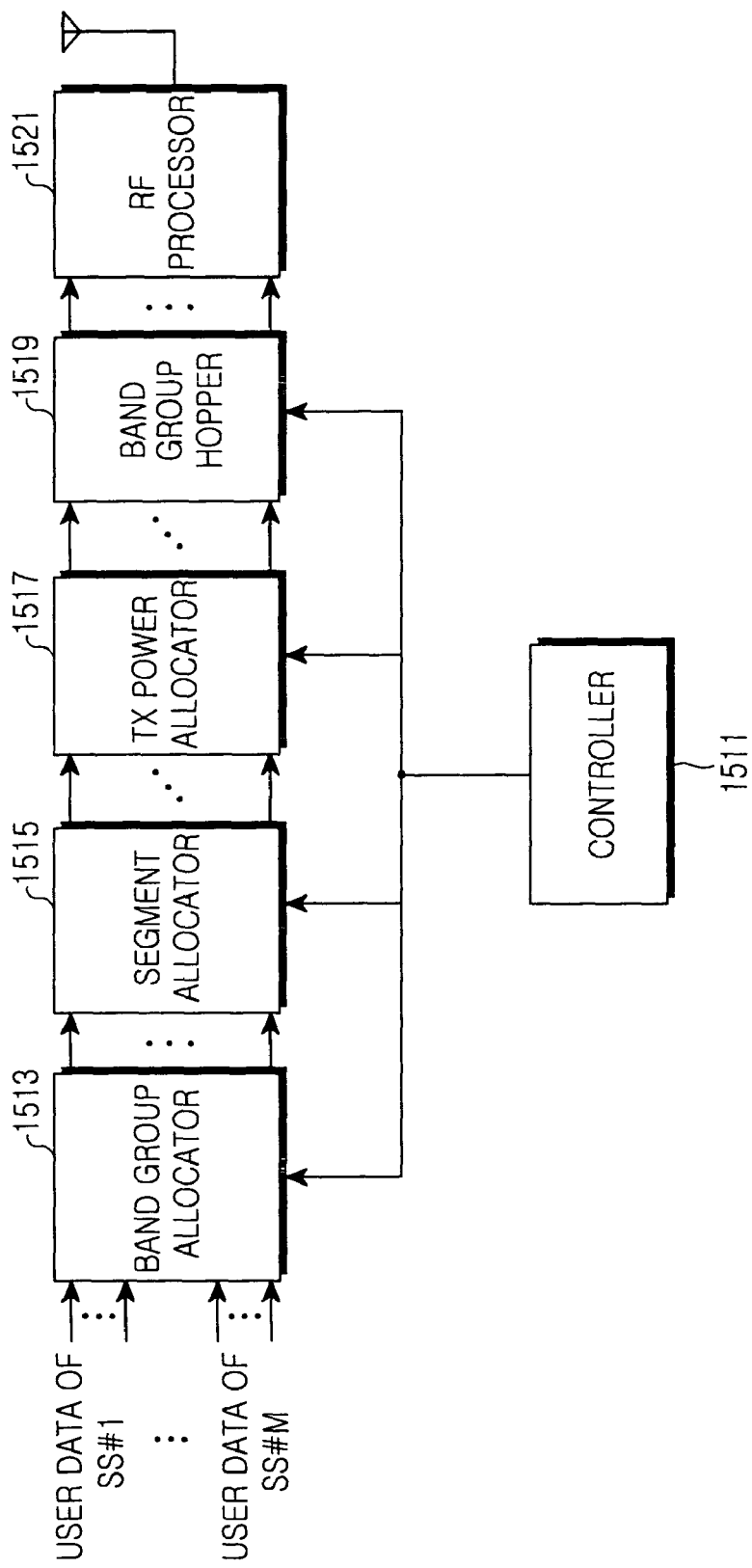
FIG. 15 illustrates a structure of a downlink transmitter according to the present invention.

FIG. 15 illustrates a structure of a downlink transmitter according to the present invention. A downlink transmitter, for example, a base station (BS) transmitter, includes a controller 1511, a band group allocator 1513, a segment allocator 1515, a transmission power allocator 1517, a band group hopper 1519, and a radio frequency (RF) processor 1521.

If user data is received from each of M subscriber stations (SSs), the controller 1511 performs scrambling on the user data from each of the M SSs and then controls the scheduled user data for each of the M SSs such that it is allocated a corresponding transmission band group in the band group allocator 1513. When performing scheduling on the user data from each of the M SSs, the controller 1511 determines whether it will allocate the corresponding user data to a band group corresponding to a center band taking into account user requirements of each of the M SSs and traffic characteristics of the user data before transmission, or allocate the user data to band groups corresponding to reuse bands before transmission. An operation of allocating a center band and reuse bands taking into account the user requirements and the traffic characteristics has been described.

The band group allocator 1513, under the control of the controller 1511, allocates a corresponding band group to the user data from each of the M SSs, and outputs the allocation results to the segment allocator 1515. A segment band allocation operation of the segment allocator 1515 is also controlled by the controller 1511, and the controller 1511 controls modulation and coding schemes for the user data from each of the M SSs according to allocation of the segment bands constituting the corresponding band group and a type of the allocated segment bands, and outputs the allocation results to the segment allocator 1515. Then the segment allocator 1515, under the control of the controller 1511, allocates segment bands constituting each band group, determines modulation and coding schemes for the user data from each of the M SSs according to the type of the allocated segment bands, and outputs the determination results to the transmission power allocator 1517. A transmission power allocation operation of the transmission power allocator 1517 is also controlled by the controller 1511, and the controller 1511 controls allocation of the transmission power according to whether a band group to be used for allocation of power transmission is a band group allocated to a center band or band groups allocated to reuse bands. As described above, when the band group is the band group allocated to the center band, the transmission power allocator 1517 can allocate high transmission power as compared when the band group is the band groups allocated to the reuse bands. The controller 1511 controls allocation of the transmission power taking into account the transmission signal power, frequency reuse factor, antenna type, system configuration, and multiple access scheme in each reuse frequency band that can minimize ICI and maximize average frequency efficiency per cell.

The transmission power allocator 1517, under the control of the controller 1511, allocates transmission power for each band group whose segment band allocation is completed, and then outputs the power allocation results to the band group hopper 1519. A band group hopping operation of the band group hopper 1519 is also controlled by the controller 1511, and the controller 1511 performs a control operation of hopping the frequency band constituting each band group periodically or a periodically. The controller 1511 controls a frequency band constituting each of the band groups such that the frequency band is hopped according to the cyclic shift pattern, the slope pattern and the random pattern described with reference to FIGS. 12 through 14. The band group hopper 1519, under the control of the controller 1511, hops the frequency band constituting the band group, and then outputs the hopping results to the RF processor 1521.

The RF processor 1521 modulates and codes the user data for each of the M SSs, output from the band group hopper 1519, according to the determined modulation and coding schemes, RF-processes the modulated coded user data, and transmits the RF-processing results over the air via a transmission antenna. The RF processor 1521, which includes a modulator, an encoder, a filter and a front-end unit, modulates and codes the user data for each of the M SSs, output from the band group hopper 1519, RF-processes the modulated coded user data such that it can be transmitted over the air, and then transmits the RF-processed user data via the antenna.

Although an operation of transmitting control information for segment bands constituting band groups allocated for each of the M SSs and a corresponding band group, their hopping pattern, and transmission power to each of the M SSs is not separately illustrated in FIG. 15, the control information can be transmitted to each of the M SSs on a one-to-one basis, i.e., on a dedicated basis, or can be commonly transmitted to each of the M SSs on a shared basis.

Figure 16:
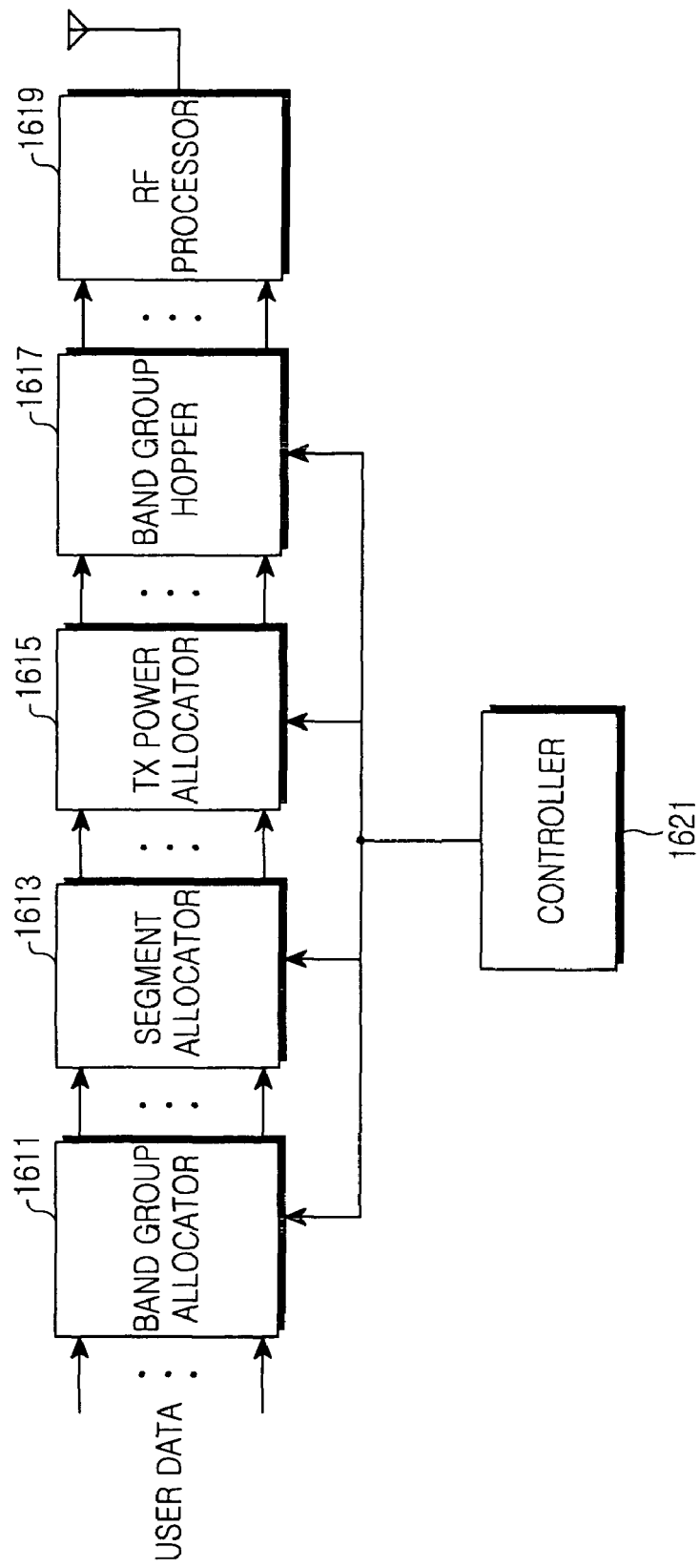
FIG. 16 illustrates a structure of an uplink transmitter according to the present invention.

FIG. 16 illustrates a structure of an uplink transmitter according to the present invention. An uplink transmitter, for example, an SS transmitter, includes a band group allocator 1611, a segment allocator 1613, a transmission power allocator 1615, a band group hopper 1617, an RF processor 1619, and a controller 1621.

When detecting the presence of user data to be transmitted from the SS to a BS through an uplink, the controller 1621 controls operations of the band group allocator 1611, the segment allocator 1613, the transmission power allocator 1615 and the band group hopper 1617 such that they may apply band groups allocated through scheduling on user data of the SS in the BS, segment bands constituting the band groups, transmission power applied to the band groups, and a hopping pattern applied to the band groups, and then controls transmission of the user data. Before transmitting the user data, the SS transmitter receives, from the BS, information on band groups allocated in the BS transmitter through scheduling on the user data of the SS, segment bands constituting the band groups, transmission power applied to the band groups, and a hopping pattern applied to the band groups. An operation of transmitting and receiving this information is not directly related to the present invention, so a detailed description thereof will be omitted herein. In addition, operations of the band group allocator 1611, the segment allocator 1613, the transmission power allocator 1615, the band group hopper 1617 and the RF processor 1619 are substantially similar to the operations of the band group allocator 1513, the segment allocator 1515, the transmission power allocator 1517, the band group hopper 1519 and the RF processor 1521 of the downlink transmitter, i.e., the BS transmitter, described with reference to FIG. 15, except for the number of SSs applied thereto, so a detailed description thereof will be omitted herein.

The present invention applies an actual frequency reuse factor $\tilde{K}=1$ in every cell in the multicell communication system to maintain a frequency reuse factor K in bands of each cell by managing a center band and reuse bands according to band characteristics of each cell while maximizing efficiency of frequency resources, thereby preventing system performance degradation due to the ICI. In addition, the present invention increases flexibility of frequency resource allocation by adaptively allocating frequency resources constituting the center band and the reuse bands according to system conditions.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating frequency resources in a serving cell in a multicell communication system including a plurality of cells, the method comprising the steps of:

dividing, by a controller, a frequency band used in the multicell communication system into a plurality of segment bands;

dividing, by the controller, the frequency band into a plurality of band groups by mapping the plurality of segment bands such that at least one segment band among the plurality of segment bands is allocated to a band group;

mapping, by the controller, the plurality of band groups such that a first band group is allocated to a center band of the serving cell;

mapping, by the controller, the plurality of band groups such that remaining band groups other than the first band group among the plurality of band groups are allocated to reuse bands;

allocating, by the controller, a plurality of band groups to be used for transmitting user data for each of a plurality of subscriber stations among the plurality of band groups if there is user data targeting the plurality of subscriber stations;

allocating, by a band group allocator, the user data for each of the subscriber stations such that the user data is transmitted through a corresponding band group;

allocating, by an segment allocator, segment bands of the plurality of band groups allocated such that the user data for each of the subscriber stations is transmitted;

RF-processing, by a RF processor, a signal of the segment-allocated band groups; and transmitting the RF-processed signal, wherein the first band group is mapped such that it is allocated to center bands of cells spaced apart by a predetermined distance from the serving cell among remaining cells other than the serving cell among the plurality of cells.

2. The method of claim 1, wherein each of the center bands is mapped such that it is allocated to a cell boundary area of a corresponding cell, and the reuse bands are mapped such that they are allocated to a cell center area of the corresponding cell.

3. The method of claim 1, wherein each of the plurality of segment bands has the same bandwidth.

4. The method of claim 1, wherein each of the
plurality of segment bands has different bandwidths taking into account at least one of a system requirement of the multicell communication system and a user requirement.

5. The method of claim 1, wherein if the multicell communication system is a multi-carrier multicell communication system using a plurality of sub-carriers,
the sub-carriers mapped to the plurality of segment bands are physically consecutive.

6. The method of claim 1, wherein if the multicell communication system is a multi-carrier multicell communication system using a plurality of sub-carriers,
the sub-carriers mapped to the plurality of segment bands are physically non-consecutive.

7. The method of claim 1, further comprising: determining a power density for each of the plurality of band groups after dividing the frequency band into the plurality of band groups.

8. The method of claim 7, wherein the power density for each of the plurality of band groups is uniformly determined.

9. The method of claim 7, wherein the
power density for each of the plurality of band groups is determined such that each of the plurality of band groups has a different power density according to characteristics of bands mapped to each of the plurality of band groups.

10. The method of claim 9, wherein
if bands mapped to each of the plurality of band groups are the center bands, the power density is determined such that it exceeds a power density applied when bands mapped to each of the plurality of band groups are the reuse bands.

11. The method of claim 9, wherein the
different power density for each of the plurality of band groups takes into account interference to the serving cell and the cells other than the serving cell among the plurality of cells for the bands mapped to each of the plurality of band groups.

12. The method of claim 9, wherein the
different power density for each of the plurality of band groups is determined taking into account a frequency reuse factor, an antenna type, configuration of the multicell communication system, and a multiple access scheme applied in the multicell communication system.

13. The method of claim 1, further comprising, after dividing the frequency band into the plurality of band groups, hopping a frequency band occupied by the plurality of segment bands constituting the plurality of band groups according to a preset hopping pattern.

14. The method of claim 13, wherein the hopping pattern is defined such that the frequency band occupied by the plurality of segment bands constituting the plurality of band groups is hopped on a cyclic shift basis within a preset period.

15. The method of claim 13, wherein the hopping pattern is defined such that the frequency band occupied by the plurality of segment bands constituting the plurality of band groups has a preset slope within a preset period.

16. The method of claim 13, wherein the hopping pattern is defined such that the frequency band occupied by the plurality of segment bands constituting the plurality of band groups is hopped according to a preset sequence within a preset period.

17. The method of claim 16, wherein the preset sequence is at least one of a random sequence and an orthogonal sequence.

18. The method of claim 1, further comprising: determining a power density for the respective segment bands of each of the plurality of band groups after dividing the frequency band into the plurality of band groups.

19. The method of claim 18, wherein the power density is determined taking into account a frequency reuse factor, an antenna type, configuration of the multicell communication system, and a multiple access scheme applied in the multicell communication system.

20. A system for allocating frequency resources in a serving cell in a multicell communication system including a plurality of cells, the system comprising:
a controller for dividing a frequency band used in the multicell communication system into a plurality of segment bands, dividing the frequency band into a plurality of band groups by mapping the plurality of segment bands such that at least one segment band among the plurality of segment bands is allocated to a band group, mapping the plurality of band groups such that a first band group is allocated to a center band of the serving cell, mapping the plurality of band groups such that remaining band groups other than the first band group among the plurality of band groups are allocated to reuse bands, and if there is user data targeting a plurality of subscriber stations, allocating a plurality of band groups to be used for transmitting the user data for each of the plurality of subscriber stations among the plurality of band groups;

a band group allocator for, under the control of the controller, allocating the user data for each of subscriber stations such that the user data is transmitted through a corresponding band group;

a segment allocator for, under the control of the controller, allocating segment bands of a plurality of band groups allocated such that the user data for each of the subscriber stations is transmitted; and a radio frequency (RF) processor for RF-processing a signal of the segment-allocated band groups and transmitting the RF-processed signal, wherein the first band group is mapped such that it is allocated to center bands of cells spaced apart by a predetermined distance from the serving cell among remaining cells other than the serving cell among the plurality of cells.

21. The method of claim 20, wherein each of the center bands is mapped such that it is allocated to a cell boundary area of a corresponding cell, and the reuse bands are mapped such that they are allocated to a cell center area of the corresponding cell.

22. The system of claim 20, wherein the controller divides the frequency band into the plurality of segment bands with a same bandwidth.

23. The system of claim 20, wherein the controller divides the frequency band into the plurality of segment bands with different bandwidths taking into account one of a system requirement of the multicell communication system and a user requirement.

24. The system of claim 20, wherein if the multicell communication system is a multi-carrier multicell communication system using a plurality of sub-carriers, the controller divides the frequency band into the plurality of segment bands such that the sub-carriers mapped to the plurality of segment bands are physically consecutive.

25. The system of claim 20, wherein if the multicell communication system is a multi-carrier multicell communication system using a plurality of sub-carriers, the controller divides the frequency band into the plurality of segment bands such that the sub-carriers mapped to the plurality of segment bands are physically non-consecutive.

26. The system of claim 20, wherein the controller allocates transmission power of the plurality of band groups allocated such that user data for each of the subscriber stations is transmitted.

27. The system of claim 26, further comprising a transmission power allocator for, under the control of the controller, allocating the transmission power of the plurality of band groups allocated such that the user data for each of the subscriber stations is transmitted.

28. The system of claim 27, wherein the controller uniformly determines a power density for each of the plurality of band groups.

29. The system of claim 27, wherein the controller determines a power density for each of the plurality of band groups such that each of the plurality of band groups has a different power density according to characteristics of bands mapped to each of the plurality of band groups.

30. The system of claim 29, wherein if bands mapped to each of the plurality of band groups are the center bands, the controller determines the power density such that it exceeds a power density applied when bands mapped to each of the plurality of band groups are the reuse bands.

31. The system of claim 29, wherein the controller determines the different power density for each of the plurality of band groups taking into account interference to the serving cell and the cells other than the serving cell among the plurality of cells for the bands mapped to each of the plurality of band groups.

32. The system of claim 29, wherein the controller determines the different power density for each of the plurality of band groups taking into account a frequency reuse factor, an antenna type, configuration of the multicell communication system, and a multiple access scheme applied in the multicell communication system.

33. The system of claim 20, wherein after dividing the frequency band into the plurality of band groups, the controller hops a frequency band occupied by the plurality of segment bands constituting the plurality of band groups according to a preset hopping pattern.

34. The system of claim 33, further comprising a band group hopper which is controlled by the controller, for hopping a frequency band occupied by the plurality of segment bands constituting the plurality of band groups according to the hopping pattern.

35. The system of claim 34, wherein the hopping pattern is defined such that a frequency band occupied by the plurality of segment bands constituting the plurality of band groups is hopped on a cyclic shift basis within a preset period.

36. The system of claim 34, wherein the hopping pattern is defined such that a frequency band occupied by the plurality of segment bands constituting the plurality of band groups has a preset slope within a preset period.

37. The system of claim 34, wherein the hopping pattern is defined such that a frequency band occupied by the plurality of segment bands constituting the plurality of band groups is hopped according to a preset sequence within a preset period.

38. The system of claim 37, wherein the preset sequence comprises at least one of a random sequence and an orthogonal sequence.

* * * * *